United States Patent
Yamazaki et al.

(10) Patent No.: US 6,587,409 B1
(45) Date of Patent: Jul. 1, 2003

(54) TILT SERVO APPARATUS FOR OPTICAL DISC RECORDING/PLAYING APPARATUS

(75) Inventors: Hitoshi Yamazaki, Kawagoe (JP); Norio Matsuda, Kawagoe (JP); Alex Bradshaw, Kawagoe (JP); Shinichi Naohara, Kawagoe (JP)

(73) Assignee: Pioneer Corporation, Tokyo (JP)

(*) Notice: Subject to any disclaimer, the term of this patent is extended or adjusted under 35 U.S.C. 154(b) by 0 days.

(21) Appl. No.: 09/576,901

(22) Filed: May 23, 2000

(30) Foreign Application Priority Data

May 24, 1999 (JP) .......................... 11-143731

(51) Int. Cl.[7] ............................... G11B 7/00
(52) U.S. Cl. .................. 369/44.28; 369/44.32; 369/53.19; 369/53.28; 369/44.27
(58) Field of Search .................. 369/44.28, 44.32, 369/53.19, 44.29, 44.35, 275.4, 112.02, 53.28, 44.27

(56) References Cited

U.S. PATENT DOCUMENTS

| | | | | |
|---|---|---|---|---|
| 5,886,496 A | * | 3/1999 | Furukawa et al. | 369/44.32 |
| 5,956,303 A | * | 9/1999 | Yonezawa | 369/44.28 |
| 6,128,258 A | * | 10/2000 | Kimura et al. | 369/116 |
| 6,169,714 B1 | * | 1/2001 | Tanaka et al. | 369/44.28 |
| 6,327,240 B1 | * | 12/2001 | Tobita et al. | 369/275.4 |

* cited by examiner

Primary Examiner—William Korzuch
Assistant Examiner—Kim-Kwok Chu
(74) Attorney, Agent, or Firm—Morgan, Lewis & Bockius LLP

(57) ABSTRACT

A tilt servo control apparatus has a tilt error correcting device for correcting a tilt error caused by a tilt angle defined between a normal at an irradiating position of a laser beam irradiated onto a recording surface of an optical recording medium and an optical axis of the laser beam. The tilt error correcting device is driven based on an intensity of the reflected light of the laser beam irradiated onto the recording surface. The apparatus provides a control to hold a drive value of the tilt error correcting device to a predetermined value in response to a track jump command for changing the irradiating position of the laser beam from the first irradiating position to the second irradiating position that is away therefrom by a distance corresponding to a predetermined number of tracks.

18 Claims, 5 Drawing Sheets

TILT SERVO APPARATUS FOR OPTICAL DISC RECORDING/PLAYING APPARATUS

BACKGROUND OF THE INVENTION

1. Field of the Invention

The invention relates to a tilt servo apparatus for an optical disc recording/playing apparatus.

2. Description of the Related Art

In a recording/playing apparatus of an optical disc such as CD (Compact Disc), DVD (Digital Versatile Disc), or the like, generally, a deviation occurs between an optical axis of a laser beam irradiated from an optical pickup and a normalcy of the optical disc at an irradiating position due to a warp or the like of the optical disc. An angle of the deviation is called a tilt angle, which mainly occurs in the radial direction of the optical disc, and creates a coma aberration or the like in an optical system. Because the tilt angle occurs, a signal deterioration such as crosstalk between a target track and an adjacent track, jitter, or the like is caused and exerts an adverse influence on playing quality of the optical disc. Particularly, in the case of performing a high density recording like a DVD, in order to reduce a spot diameter of the laser beam, it is necessary to shorten the wavelength of the laser beam and increase the numerical aperture NA of an objective lens, so that a margin for the tilt angle decreases. That is, even if the optical disc is slightly inclined, the playing quality is largely deteriorated. In a multilayer disc like a DVD double-layer disc or the like in which a recording surface is constructed by a multilayer structure in order to increase a recording capacity, even in the case of changing the recording surface during the playback of the optical disc, it is necessary to allow a tilt servo to operate stably. To correct the aberration due to the tilt angle during the playback of the optical disc, generally, a tilt servo mechanism for correcting a tilt error on the basis of a detection signal intensity of the reflected laser beam is provided. As one of the tilt servo systems, there is a tilt servo apparatus using a liquid crystal panel device. It is an operational principle of the tilt servo using the liquid crystal panel device that a wavefront aberration which is caused by the tilt of the optical disc is compensated by controlling a phase of the liquid crystal mounted on the optical pickup. A tilt servo apparatus using a liquid crystal device in order to compensate the wavefront aberration has been disclosed in Japanese Patent Application No. 8-344540, filed by the same applicant as that of the present invention.

Generally, a reflectance at the inner rim and that at the outer rim of the optical disc are different. However, in the conventional tilt servo apparatus for correcting the tilt error on the basis of the detection signal intensity of the reflection light, there is such a problem that in the case of changing a reading position to a track away from the present track (track jump), a tilt servo control does not adequately function. Since reflectance values of two layers are different in the multilayer disc, there is such a problem that in the case of changing (interlayer jump: namely, jump from one layer to another layer) a reading surface from a present recording surface to another recording surface and continuing the playback, control performance of the tilt servo is deteriorated or, in the worst case, the control is disabled.

SUMMARY OF THE INVENTION

It is an object of the present invention to provide a tilt servo apparatus which can perform a stable tilt servo control even when an amount of reflection light from an optical disc largely changes for a track jump, an interlayer jump, or the like upon playback of the optical disc.

According to one preferred aspect of the invention, there is provided a tilt servo apparatus comprising: photodetecting means for detecting a reflection light of a laser beam irradiated to a recording surface of an optical recording medium; tilt error correcting means for correcting a tilt error caused by a tilt angle that is defined between a normal at the laser beam irradiating position on the recording surface and an optical axis of the laser beam; driving means for driving the tilt error correcting means in response to an intensity of a detection signal of the photodetecting means; and control means for holding a drive value of the tilt error correcting means to a predetermined value in response to a track jump command for changing the irradiating position of the laser beam from a first irradiating position to a second irradiating position that is spaced from the first irradiating position by a distance corresponding to a predetermined number of tracks.

According to another aspect of the invention, there is provided a tilt servo apparatus comprising: photodetecting means for detecting a reflection light of a laser beam irradiated to a recording surface of an optical recording medium having a plurality of recording surfaces; tilt error correcting means for correcting a tilt error caused by a tilt angle that is defined between a normal at the laser beam irradiating position on the recording surface and an optical axis of the laser beam; driving means for driving the tilt error correcting means on the basis of an intensity of a detection signal of the photodetecting means; and control means for holding a drive value of the tilt error correcting means to a predetermined value in response to an interlayer jump command for changing the irradiating position of the laser beam from a first recording surface on the optical recording medium to a second recording surface.

According to further another aspect of the invention, there is provided a tilt servo apparatus comprising: photodetecting means for detecting a reflection light of a laser beam irradiated to a recording surface of an optical recording medium; tilt error correcting means for correcting a tilt error caused by a tilt angle that is defined between a normal at the laser beam irradiating position on the recording surface and an optical axis of the laser beam; driving means for driving the tilt error correcting means on the basis of an intensity of a detection signal of the photodetecting means; and control means for holding the detection signal intensity to a predetermined intensity in response to a track jump command for changing the irradiating position of the laser beam from a first irradiating position to a second irradiating position that is spaced from the first irradiating position by a distance corresponding to a predetermined number of tracks.

According to further another aspect of the invention, there is provided a tilt servo apparatus comprising: photodetecting means for detecting a reflection light of a laser beam irradiated to a recording surface of an optical recording medium having a plurality of recording surfaces; tilt error correcting means for correcting a tilt error caused by a tilt angle that is defined between a normal at the laser beam irradiating position on the recording surface and an optical axis of the laser beam; driving means for driving the tilt error correcting means on the basis of an intensity of a detection signal of the photodetecting means; and control means for holding the detection signal intensity to a predetermined intensity in response to an interlayer jump command for changing the irradiating position of the laser beam from a first recording surface on the optical recording medium to a second recording surface.

In the tilt servo apparatus according to the invention, the control means further has memory means for storing the drive value or detection signal intensity of the tilt error correcting means before the jump command is executed and controls so as to hold the drive value or the signal intensity to the stored drive value or the stored signal intensity.

In the tilt servo apparatus according to the invention, the control means starts the drive value holding control or the signal intensity holding control in accordance with a start of the execution of the jump command.

In the tilt servo apparatus according to the invention, the control means finishes the drive value holding control or the signal intensity holding control in accordance with an end of the execution of the jump command.

Further, in the tilt servo apparatus according to the invention, the drive value of the tilt error correcting means after the end of the holding control is determined by comparing the drive value at the time of the holding control with a predetermined reference drive value.

DETAILED DESCRIPTION OF THE PREFERRED EMBODIMENT

An embodiment of the present invention will now be described in detail hereinbelow with reference to the drawings.

Figure 1:
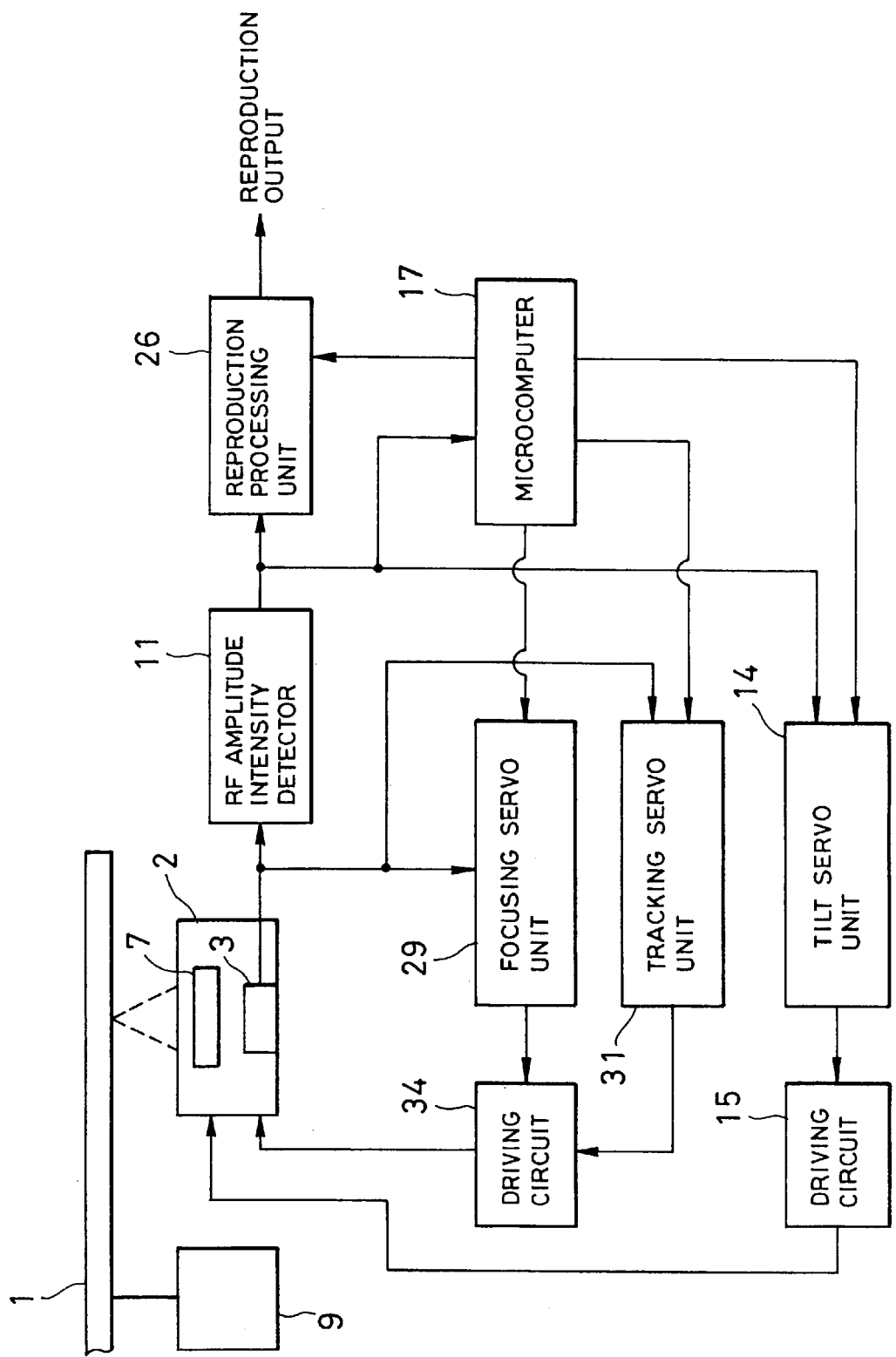
FIG. 1 is a block diagram schematically showing a construction of an optical disc player having a tilt servo apparatus according to the invention.
Figure 2:
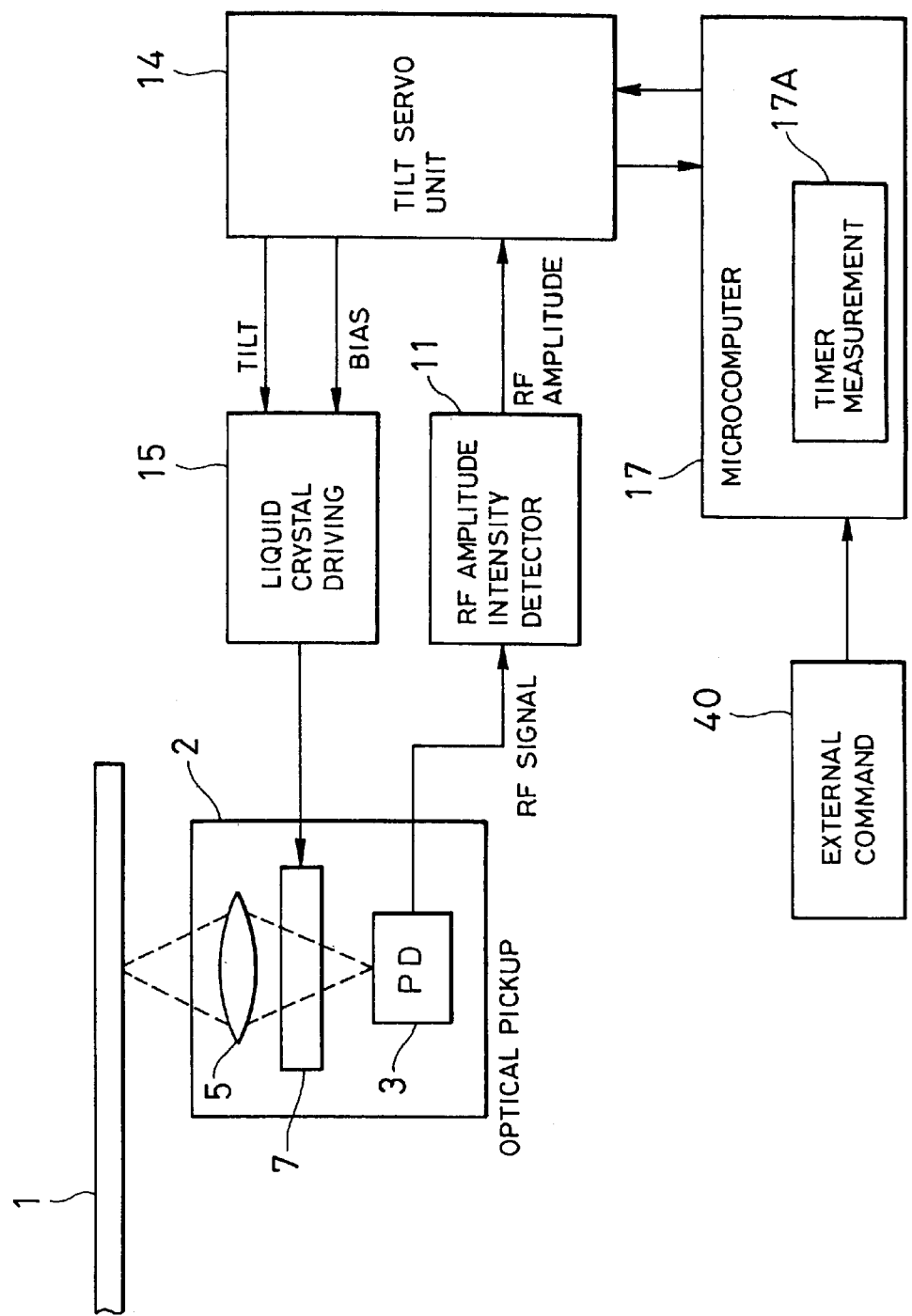
FIG. 2 is a block diagram showing a construction of the tilt servo apparatus according to the invention.

FIG. 1 is a diagram schematically showing a construction of an optical disc player having a tilt servo apparatus according to the invention. FIG. 2 is a diagram showing constructional portions regarding the tilt servo apparatus.

In the optical disc player, an optical pickup 2 irradiates a laser beam onto an optical disc 1, receives light reflected from the optical disc 1 for the irradiated laser beam, and generates a signal corresponding to an amount of received light. The optical disc 1 is rotated by a motor 9.

In the optical pickup 2, a liquid crystal device 7 for aberration correction in the disc radial direction is arranged on an optical axis of the laser beam and can correct a wavefront aberration of an optical system. The liquid crystal device 7 is divided into, for example, a plurality of regions. Those regions are variably controlled in every region by an individual driving voltage which is generated from a tilt servo unit 14. A phase difference of the light passing through each region is individually changed, so that a wavefront aberration such as a coma aberration which is caused due to a tilt occurring in the disc radial direction can be corrected.

As shown in FIG. 2, the optical pickup 2 includes a photodetector 3, a lens 5, and the liquid crystal device 7. The photodetector 3 has, for example, a 4-split photodetector comprising four photodetecting devices. An RF amplitude intensity detector 11, a focusing servo unit 29, and a tracking servo unit 31 are connected to the photodetector 3. The focusing servo unit 29 supplies a control signal so as to set a difference between sum signals of diagonal components of the respective photodetecting devices to 0 to a focusing/tracking driving circuit 34. The tracking servo unit 31 supplies a control signal so as to set a difference between sum signals of the two sets of photodetecting devices which face each other with respect to the track direction to 0 to the focusing/tracking driving circuit 34. The RF amplitude intensity detector 11 receives an RF detection signal from the photodetector 3 and supplies an RF amplitude signal to the tilt servo unit 14. Those controls are performed in response to commands from a microcomputer 17.

The tilt servo unit 14 generates a tilt driving signal so as to maximize an envelope intensity of the RF amplitude signal to a liquid crystal driving circuit 15 by using the RF amplitude signal. The tilt servo unit 14 also generates a bias signal indicative of a bias point for making the liquid crystal device 7 operative to the liquid crystal driving circuit 15. As a bias signal, usually, a center voltage in a region where phase characteristics of a liquid crystal are linear is designated and can be changed in accordance with temperature characteristics of the liquid crystal. The liquid crystal device 7, consequently, can vary the phase difference of the light passing through the liquid crystal device 7 and corrects the aberration, thereby functioning as tilt error correcting means. The microcomputer 17 controls the tilt servo unit 14 so as to perform the optimum tilt servo. Memories (not shown) comprising a ROM and a RAM are constructed in the tilt servo unit 14 and microcomputer 17.

Further, as shown in FIG. 2, the microcomputer 17 has a timer 17A and controls the tilt servo unit 14 on the basis of a measurement output of the timer 17A and commands from an external command unit 40. As commands from an external command unit 40, for example, there is a command corresponding to operation of the user, namely, a playing command accompanied with a track jump or an interlayer jump. Besides the command, there is a track jump command and an interlayer jump command based on program information recorded on the optical disc.

A tilt servo control in the embodiment will now be described in detail with reference to a flowchart shown in FIG. 3 and diagrams for explaining the operations shown in FIGS. 4, 5, 6A and 6B.

Figure 3:
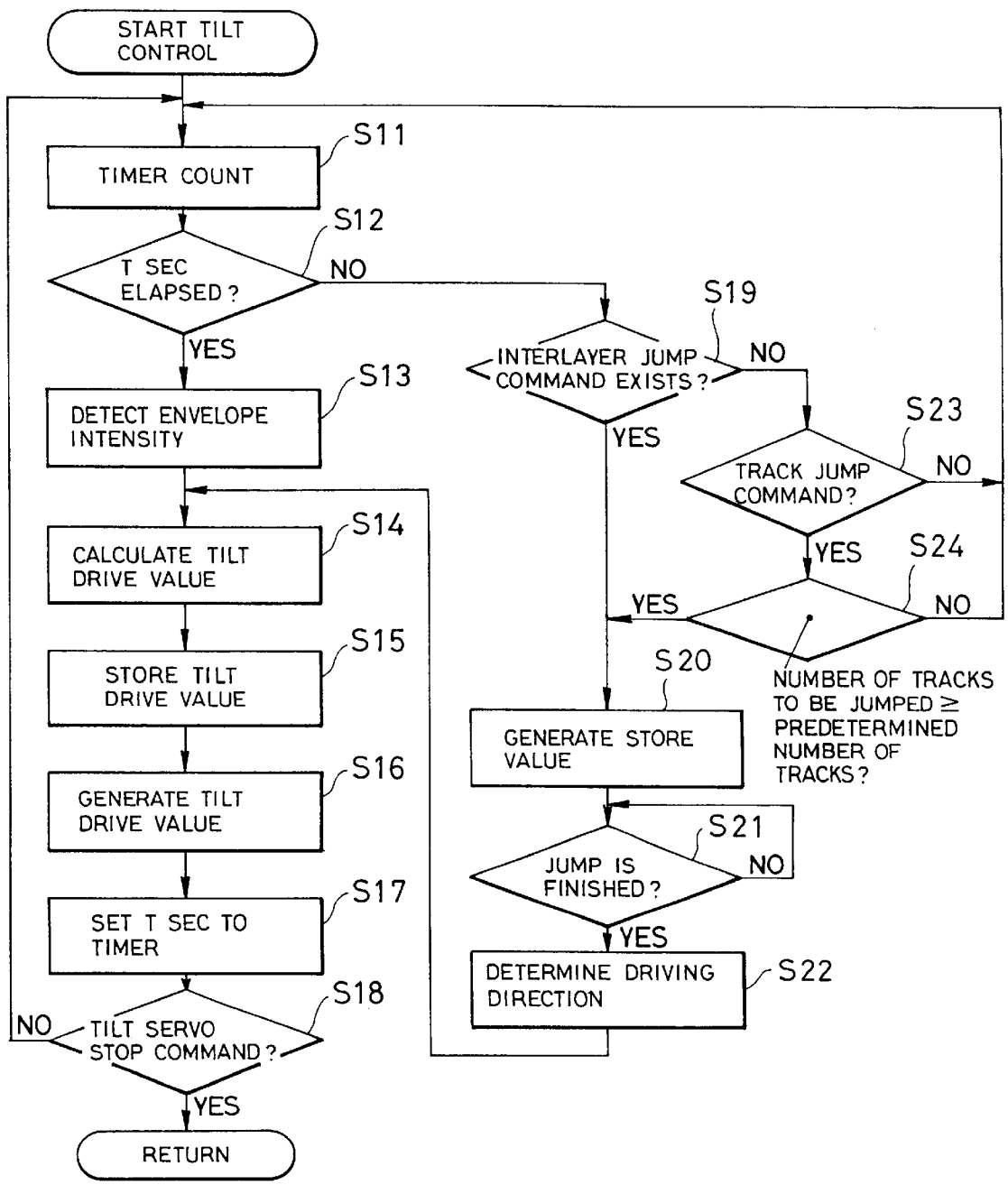
FIG. 3 is a flowchart showing a procedure for a tilt servo control according to the first embodiment of the invention.
Figure 4:
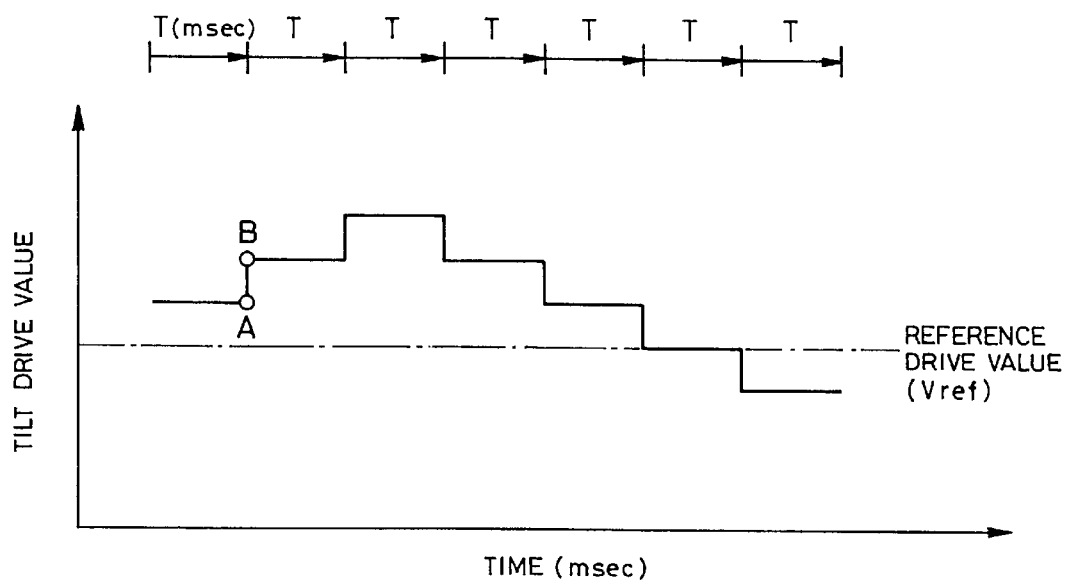
FIG. 4 is a diagram for explaining the operation of the tilt servo control according to the first embodiment of the invention.

The operation shown in the flowchart of FIG. 3 is executed by the tilt servo unit 14 and microcomputer 17. First, in the control routine, the liquid crystal device 7 is driven in response to a tilt driving signal output (hereinafter, referred to as a tilt drive value) of the tilt servo unit 14 and an elapsed time after the tilt drive value has been set is measured by the timer 17A (step S11). In step S12, whether a predetermined driving time T (milliseconds) has elapsed or not is discriminated. The predetermined driving time T is determined in accordance with a response speed of the liquid crystal device 7. When it is determined that the driving time T has elapsed, the microcomputer 17 detects the envelope intensity of the RF amplitude (step S13; point A in FIG. 4) and calculates a tilt drive value on the basis of the envelope intensity (step S14). Subsequently, the microcomputer 17 stores the calculated tilt drive value (step S15) and generates the tilt drive value from the tilt servo unit 14 to the liquid crystal driving circuit 15 (step S16; point B in FIG. 4). As a change amount of the tilt drive value in this case, a predetermined value can be used or a value calculated so as to have the optimum tilt correction amount can be also used. The timer 17A is set to the predetermined driving time T (step S17) and it is determined whether the tilt servo stop command is issued or not (step S18). When the tilt servo stop command is issued, the processing routine exits the control routine. When the tilt servo stop command is not issued, the processing routine advances to step S11.

In step S12, when it is decided that the driving time T has not elapsed, it is determined whether the interlayer jump command for instructing that the reading point (laser beam irradiating position) of the optical pickup jumps between the recording surfaces to play back is issued or not (step S19).

Figure 5:
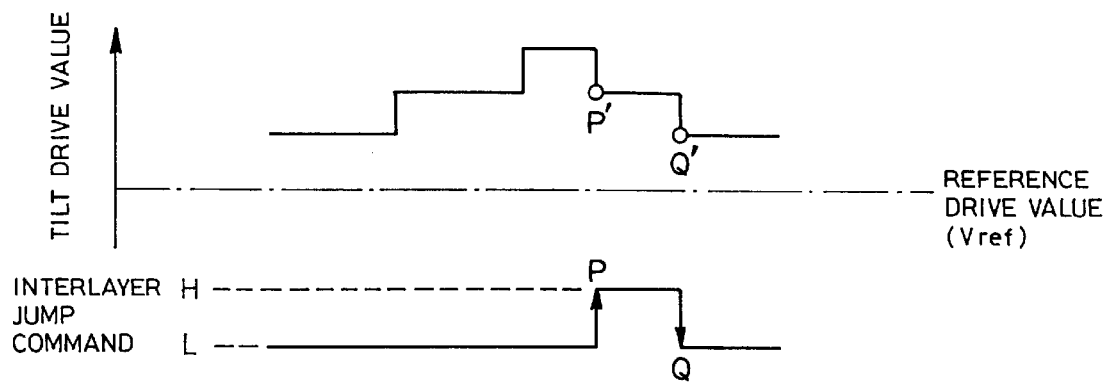
FIG. 5 is a diagram for explaining the operation of the tilt servo control according to the first embodiment of the invention.

In step S19, for example, if the interlayer jump command is issued by setting the interlayer jump command signal from the external command unit 40 to the high (H) level (point P in FIG. 5), the tilt drive value just before the track jump as a value stored in step S15 is generated to the liquid crystal driving circuit 15 (step S20; point P' in FIG. 5). Subsequently, it is determined whether the interlayer jump has finished or not (step S21). As shown in FIG. 5, while the interlayer jump command is issued (while the interlayer jump command signal is at the H level), namely, in the case where the interlayer jump is being executed and the reading point of the pickup 2 does not reach a track position to read on the next recording surface, the tilt drive value is held to the stored value. The stable servo control is performed by holding the tilt drive value. That is, a situation can be avoided in which the tilt servo follows an oscillation of the envelope intensity during the jump and an unstable servo operation is caused or, in the worst case, the control is disabled.

Figure 6A:
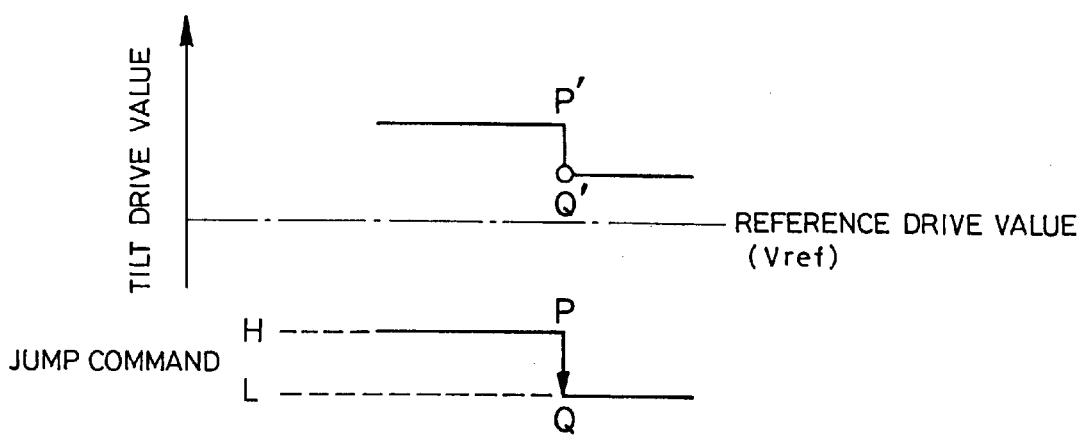
FIGS. 6A and 6B are diagrams for explaining the operation of the tilt servo control according to the first embodiment of the invention.
Figure 6B:
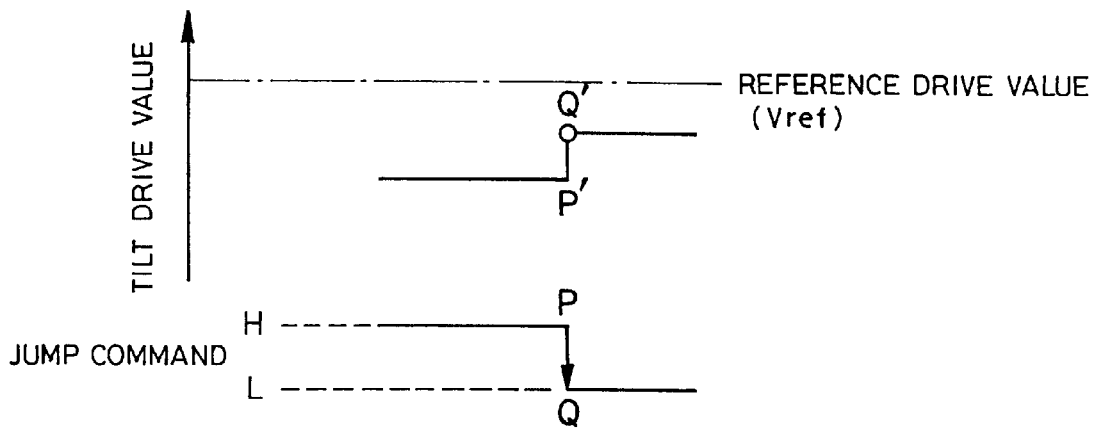

In step S21, when the interlayer jump is finished and the reading point of the pickup 2 reaches the next track position to read (the interlayer jump command signal is at the L level; point Q in FIG. 5), the driving direction for increasing or decreasing the tilt drive value is decided (step S22). A method of deciding the driving direction will now be described hereinbelow with reference to FIGS. 6A and 6B. As shown in FIG. 6A, when the held tilt drive value is larger than a predetermined reference drive value (Vref), it is determined to change the direction so as to reduce the tilt drive value. As shown in FIG. 6B, when the held tilt drive value is smaller than the predetermined reference drive value (Vref), it is determined to change the direction so as to increase the tilt drive value. When the direction of the tilt drive value is determined, step S14 follows and the subsequent procedure is repeated.

In step S19, when the interlayer jump command signal is not issued, it is determined whether the track jump command is issued or not (step S23). When the track jump command is not issued, the processing routine is returned to step S11. When the track jump command is issued, it is determined whether the number of tracks to be jumped is equal to or larger than a predetermined number of tracks or not, namely, whether the track jump is a long distance track jump or not (step S24). When the number of tracks to be jumped is less than the predetermined number of tracks, namely, when the track jump is a short distance track jump, the processing routine is returned to step S11. In the case of the long distance track jump, step S20 follows and the same procedure (steps S20 to S22) as that in the case where the interlayer jump command has been received is executed. After that, step S14 follows. That is, in the above control routine, the procedure in steps S20 to S22 is not executed in the short distance track jump. In the case of a change of the track position of a short distance in which the reflectance is not largely changed, the tilt drive value is not held.

As described above, in the embodiment, even in the case where the reading point of the pickup is largely changed or the pickup jumps between the recording layers and the playback is continued, by holding the tilt drive value just before the jump and performing the tilt correction, such a situation that the tilt control performance is deteriorated or the control is disabled can be avoided and stable servo operation can be obtained.

In the above embodiment, although the case of holding the tilt drive value has been described as an example, a detection intensity of the RF envelope signal can be held. That is, a similar effect can be derived so long as a construction in which the tilt drive value is equivalently held is used.

In the above embodiment, the example is given where, after the interlayer jump or track jump, the tilt drive value is increased or decreased by the predetermined amount or the calculated value has been described as an example, the tilt drive value can be also positively set to the reference drive value after the jump.

In the above embodiment, further, although the case of holding the tilt drive value just before the jump has been described as an example, the tilt drive value to be held is not limited thereto but a near tilt drive value in which the jump command has been issued can be held.

In the above embodiment, although the procedure in which the tilt drive value is not held at the time of the short distance jump has been disclosed, the predetermined number of tracks can be set to a small enough value so as not to cause a large change in the reflectance or the tilt drive value can also be held in the case of changing the tracks.

As will be obviously understood from the above description, according to the invention, the tilt servo apparatus which can perform a stable servo operation can be provided even when the detection signal intensity has large fluctuations as in the case of a track jump, interlayer jump, or the like.

What is claimed is:
1. A tilt servo apparatus comprising:
   photodetecting means for detecting a reflected light of a laser beam irradiated to a recording surface of an optical recording medium;
   tilt error correcting means for correcting a tilt error caused by a tilt angle that is defined between a normal at a laser beam irradiating position on said recording surface and an optical axis of said laser beam;
   driving means for driving said tilt error correcting means on the basis of an intensity of a detection signal of said photodetecting means; and
   control means for holding a drive value of said tilt error correcting means to a predetermined value in response to a track jump command for changing said irradiating position of said laser beam from a first irradiating position to a second irradiating position,
   wherein said control means includes memory means, in accordance with a start of the execution of said jump command, for storing the drive value of said tilt error correcting means before said jump command is executed, and said predetermined value is said stored drive value.
2. An apparatus according to claim 1, wherein said control means finishes said drive value holding control in accordance with an end of the execution of said jump command.
3. An apparatus according to claim 1, wherein said tilt error correcting means is a liquid crystal device for aberration correction arranged on the optical axis of said laser beam.

4. A tilt servo apparatus comprising:

photodetecting means for detecting a reflected light of a laser beam irradiated to a recording surface of an optical recording medium having a plurality of recording surfaces;

tilt error correcting means for correcting a tilt error caused by a tilt angle that is defined between a normal at a laser beam irradiating position on said recording surface and an optical axis of said laser beam;

driving means for driving said tilt error correcting means on the basis of an intensity of a detection signal of said photodetecting means; and control means for holding a drive value of said tilt error correcting means to a predetermined value in response to an interlayer jump command for changing the irradiating position of said laser beam from a first recording surface on said optical recording medium to a second recording surface, wherein said control means starts said drive value holding control in accordance with a start of the execution of said jump command, and includes memory means for storing the drive value of said tilt error correcting means before said jump command is executed, and said predetermined value is said stored drive value.

5. An apparatus according to claim 4, wherein said control means finishes said drive value holding control in accordance with an end of the execution of said jump command.

6. An apparatus according to claim 4, wherein said tilt error correcting means is a liquid crystal device for aberration correction arranged on the optical axis of said laser beam.

7. A tilt servo apparatus comprising:

photodetecting means for detecting a reflected light of a laser beam irradiated to a recording surface of an optical recording medium;

tilt error correcting means for correcting a tilt error caused by a tilt angle that is defined between a normal at a laser beam irradiating position on said recording surface and an optical axis of said laser beam;

driving means for driving said tilt error correcting means on the basis of an intensity of a detection signal of said photodetecting means; and control means for holding said detection signal intensity to a predetermined intensity in response to a track jump command for changing said irradiating position of said laser beam from a first irradiating position to a second irradiating position, wherein said control means starts said signal intensity holding control in accordance with a start of the execution of said jump command, and includes memory means for storing said detection signal intensity before said jump command is executed, and said predetermined intensity is said stored signal intensity.

8. An apparatus according to claim 7, wherein said control means finishes said signal intensity holding control in accordance with an end of the execution of said jump command.

9. An apparatus according to claim 8, wherein a drive value of said tilt error correcting means after the end of said holding control is determined by comparing a drive value at the time of said holding control with a predetermined reference drive value.

10. An apparatus according to claim 7, wherein said tilt error correcting means is a liquid crystal device for aberration correction arranged on the optical axis of said laser beam.

11. A tilt servo apparatus comprising:

photodetecting means for detecting a reflected light of a laser beam irradiated to a recording surface of an optical recording medium having a plurality of recording surfaces;

tilt error correcting means for correcting a tilt error caused by a tilt angle that is defined between a normal at a laser beam irradiating position on said recording surface and an optical axis of said laser beam;

driving means for driving said tilt error correcting means on the basis of an intensity of a detection signal of said photodetecting means; and control means for holding said detection signal intensity to a predetermined intensity in response to an interlayer jump command for changing the irradiating position of said laser beam from a first recording surface on said optical recording medium to a second recording surface, wherein said control means includes memory means, in accordance with a start of the execution of said jump command, for storing said detection signal intensity before said jump command is executed, and said predetermined intensity is said stored signal intensity.

12. An apparatus according to claim 11, wherein said control means finishes said signal intensity holding control in accordance with an end of the execution of said jump command.

13. An apparatus according to claim 12, wherein a drive value of said tilt error correcting means after the end of said holding control is determined by comparing a drive value at the time of said holding control with a predetermined reference drive value.

14. An apparatus according to claim 11, wherein said tilt error correcting means is a liquid crystal device for aberration correction arranged on the optical axis of said laser beam.

15. A tilt servo apparatus comprising:

a photodetector which detects a reflected light of a laser beam irradiated to a recording surface of an optical recording medium;

a tilt error correcting device which corrects a tilt error caused by a tilt angle that is defined between a normal at a laser beam irradiating position on said recording surface and an optical axis of said laser beam;

a driver which drives said tilt error correcting device on the basis of an intensity of a detection signal of said photodetector; and a controller which holds a drive value of said tilt error correcting device to a predetermined value in response to a track jump command for changing said irradiating position of said laser beam from a first irradiating position to a second irradiating position, wherein said controller includes a memory device, in accordance with a start of the execution of said jump command, which stores the drive value of said tilt error correcting device before said jump command is executed, and said predetermined value is said stored drive value.

16. A tilt servo apparatus comprising:

a photodetector which detects a reflected light of a laser beam irradiated to a recording surface of an optical recording medium having a plurality of recording surfaces;

a tilt error correcting device which corrects a tilt error caused by a tilt angle that is defined between a normal at a laser beam irradiating position on said recording surface and an optical axis of said laser beam;

a driver which drives said tilt error correcting device on the basis of an intensity of a detection signal of said photodetector; and a controller which holds a drive value of said tilt error correcting device to a predetermined value in response to an interlayer jump command for changing the irradiating position of said laser beam from a first recording surface on said optical recording medium to a second recording surface, wherein said controller starts said drive value holding control in accordance with a start of the execution of said jump command, and includes a memory for storing the drive value of said tilt error correcting device before said jump command is executed, and said predetermined value is said stored drive value.

17. A tilt servo apparatus comprising:

a photodetector which detects a reflected light of a laser beam irradiated to a recording surface of an optical recording medium;

a tilt error correcting device which corrects a tilt error caused by a tilt angle that is defined between a normal at a laser beam irradiating position on said recording surface and an optical axis of said laser beam;

a driver which drives said tilt error correcting device on the basis of an intensity of a detection signal of said photodetector; and a controller which holds said detection signal intensity to a predetermined intensity in response to a track jump command for changing said irradiating position of said laser beam from a first irradiating position to a second irradiating position, wherein said controller starts said signal intensity holding control in accordance with a start of the execution of said jump command, and includes a memory for storing said detection signal intensity before said jump command is executed, and said predetermined intensity is said stored signal intensity.

18. A tilt servo apparatus comprising:

a photodetector which detects a reflected light of a laser beam irradiated to a recording surface of an optical recording medium having a plurality of recording surfaces;

a tilt error correcting device which corrects a tilt error caused by a tilt angle that is defined between a normal at a laser beam irradiating position on said recording surface and an optical axis of said laser beam;

a driver which drives said tilt error correcting device on the basis of an intensity of a detection signal of said photodetector; and a controller which holds said detection signal intensity to a predetermined intensity in response to an interlayer jump command for changing the irradiating position of said laser beam from a first recording surface on said optical recording medium to a second recording surface, wherein said controller starts said signal intensity holding control in accordance with a start of the execution of said jump command, and includes a memory for storing said detection signal intensity before said jump command is executed, and said predetermined intensity is said stored signal intensity.

* * * * *